March 21, 1967 E. RONDTHALER ETAL 3,309,959
REPROPORTIONING CAMERA
Filed Feb. 3, 1965 4 Sheets-Sheet 1

INVENTORS
EDWARD RONDTHALER
RICHARD J. DECKER
MICHAEL A. SCOTTO
BY
Morgan, Finnegan, Durham & Pine
ATTORNEYS March 21, 1967   E. RONDTHALER ET AL   3,309,959
REPROPORTIONING CAMERA
Filed Feb. 3, 1965   4 Sheets-Sheet 2

INVENTORS.
EDWARD RONDTHALER
RICHARD J. DECKER
MICHAEL A. SCOTTO
BY
Morgan, Finnegan, Durham & Pine
ATTORNEYS March 21, 1967

E. RONDTHALER ET AL 3,309,959

REPROPORTIONING CAMERA

Filed Feb. 3, 1965

INVENTORS.
EDWARD RONDTHALER
RICHARD J. DECKER
MICHAEL A. SCOTTO
BY
Morgan, Finnegan, Durham & Pine
ATTORNEYS March 21, 1967     E. RONDTHALER ET AL     3,309,959
REPROPORTIONING CAMERA
Filed Feb. 3, 1965     4 Sheets-Sheet 4
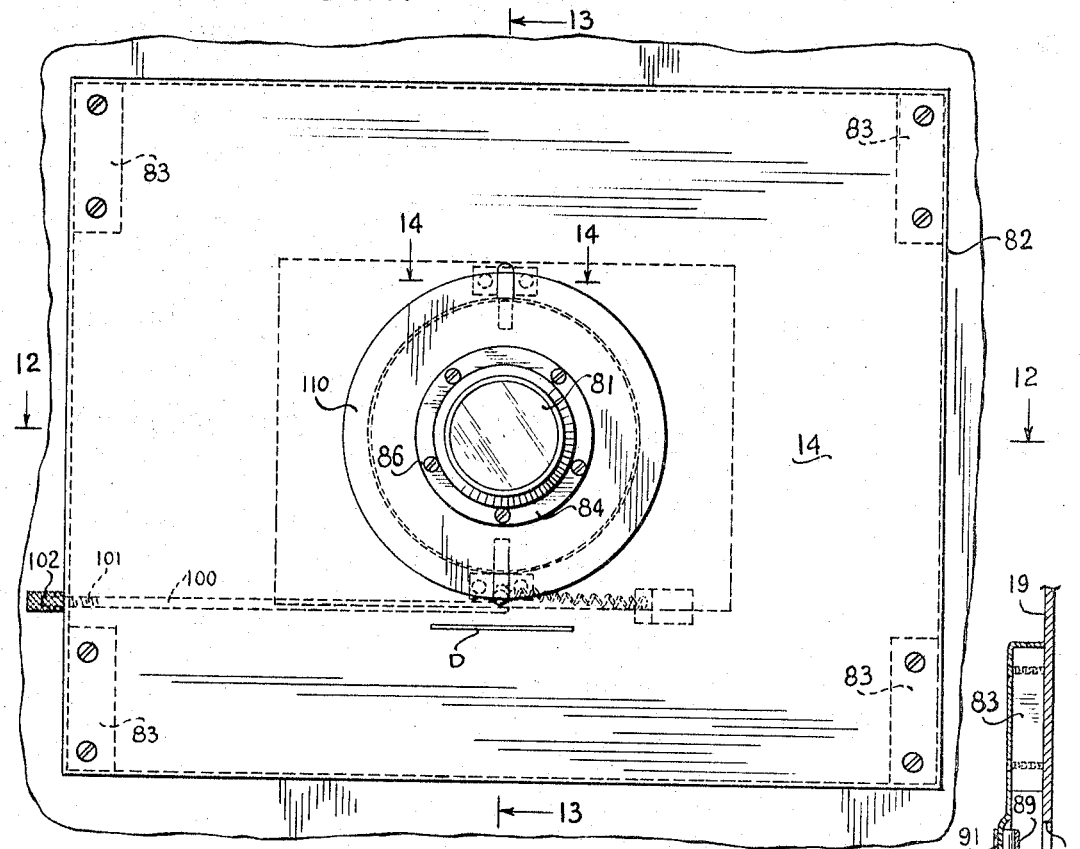
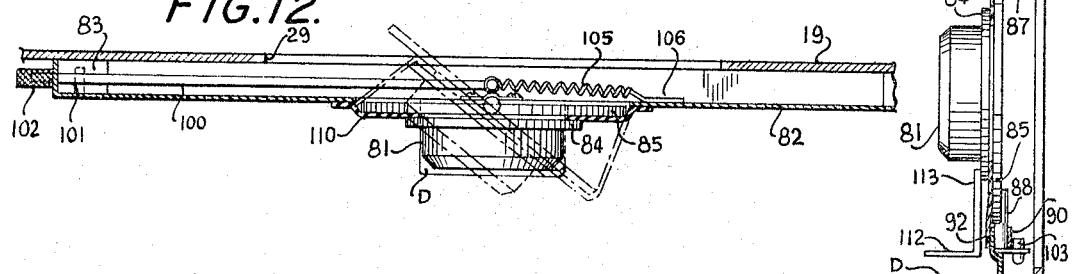
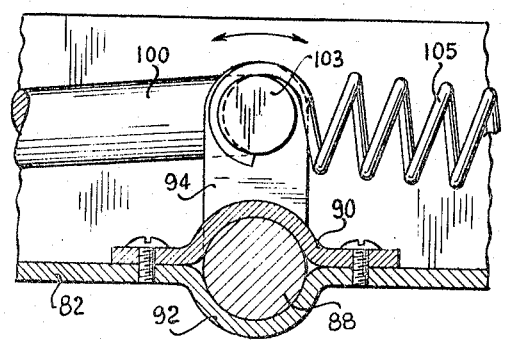
INVENTORS.
EDWARD RONDTHALER
RICHARD J. DECKER
MICHAEL A. SCOTTO
BY Morgan, Finnegan, Durham & Pine
ATTORNEYS

United States Patent Office 3,309,959
Patented Mar. 21, 1967

3,309,959
REPROPORTIONING CAMERA
Edward Rondthaler, Croton-on-Hudson, Richard J. Decker, Huntington, and Michael A. Scotto, Bronx, N.Y., assignors to Electrographic Corporation, New York, N.Y., a corporation of Delaware
Filed Feb. 3, 1965, Ser. No. 429,999
3 Claims. (Cl. 88—24)

This invention relates generally to reproportioning cameras, and relates more particularly to a reporportioning camera having a simplified construction and capable of easier, faster, and more efficient operation.

It is therefore an object of this invention to provide a reproportioning camera of simplified construction and operation.

Another object of this invention is to provide in a novel reproportioning camera construction, a T-square method of squaring the copyboard and focus board into alignment.

Another object of this invention is to provide in a novel reproportioning camera construction, reproportioning scales which read directly in percentages of reproportionment thereby eliminating conversion charts.

Another object of this invention is to provide in a novel reproportioning camera construction, a lensboard which permits universal movement of the camera lens.

A further object of this invention is to provide a novel reproportioning camera construction which permits operation of the camera from a single side position.

A further object of this invention is to provide a novel reproportioning camera construction which may also be used as a photostat machine.

Other objects and advantages of the invention are set forth in part herein and in part will be obvious herefrom, or may be learned by practice with the invention, the same being realized and attained by means of the instrumentalities and combinations pointed out in the appended claims.

The present invention is characterized by a novel reproportioning camera construction, designed to be positioned and operated entirely within a dark room. The copy and film boards are mounted so that each may be seen simultaneously and adjusted by an operator from a single sitting position. Each of the boards is pivotally mounted on a base which in turn slides on a pair of parallel tracks. The boards are maintained in square alignment with each other in all positions by providing one of the tracks and a surface of each base sliding thereagainst with straight edges which can be held square with respect to each other. The camera lens is in turn pivotally mounted in a lensboard, the lensboard being magnetically attached to the camera box housing, providing universal movement of the lens. The reproportioning scales for each of the copyboard, filmboard and camera lens read directly in percentages of reproportioning, thereby removing the necessity of a conversion chart.

The invention consists in the novel parts, constructions, arrangements, combinations and improvements herein shown and described.

It will be understood that the foregoing general description and the following detailed description as well are exemplary and explanatory of the invention but are not restrictive thereof.

Of the drawings:

FIGURE 11 is a fragmentary front elevational view of the camera construction of FIGURE 1, illustrating the details of the universal lensboard of the camera construction embodying this invention;

FIGURE 12 is a fragmentary sectional view taken along line 12—12 of FIGURE 11;

FIGURE 13 is a fragmentary sectional view taken along line 13—13 of FIGURE 11; and FIGURE 14 is an enlarged fragmentary sectional view taken along line 14—14 of FIGURE 11.

Figure 1:
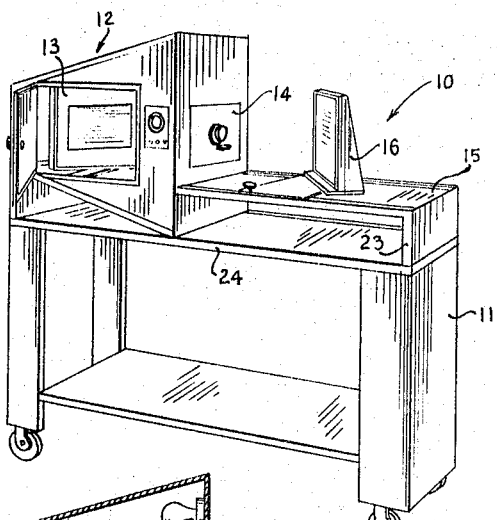
FIGURE 1 is a perspective view of a reproportioning camera construction embodying this invention, mounted on a portable stand.
Figure 2:
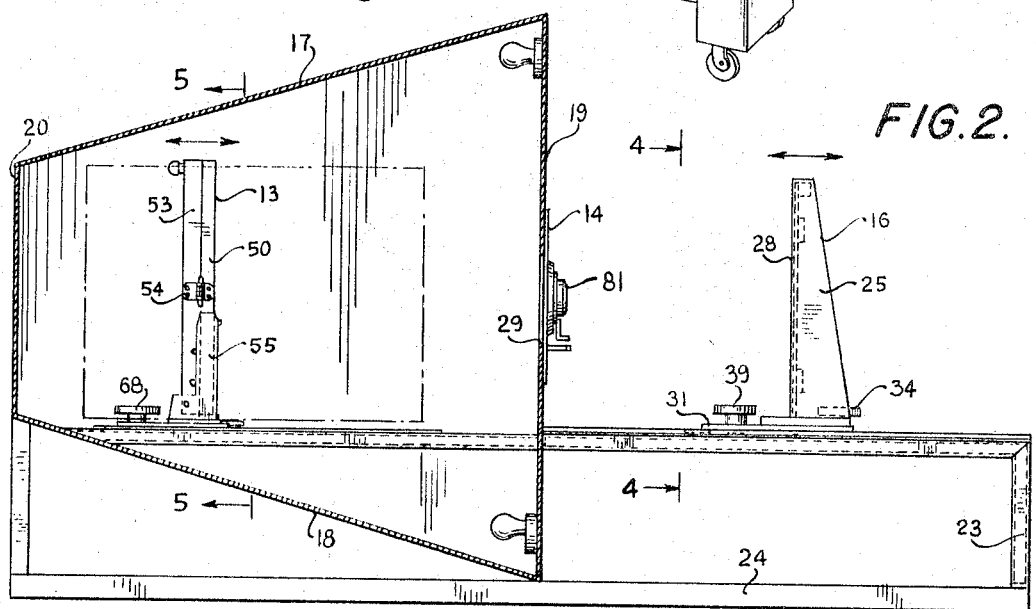
FIGURE 2 is a view in side elevation, partly in section, illustrating the camera construction of FIGURE 1.
Figure 7:
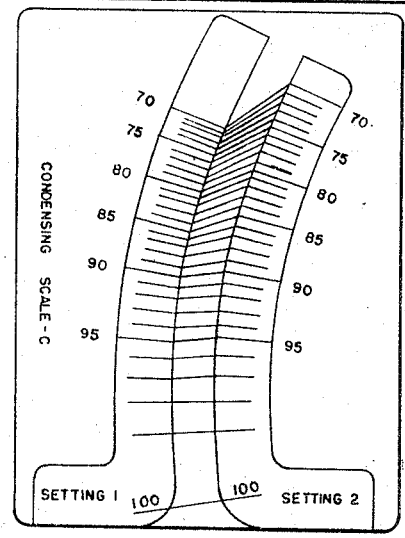
FIGURE 7 is an enlarged view of scale C, mounted on the copyboard base plate, illustrating the condensing scales reading directly in percentages of reproportionment.
Figure 8:
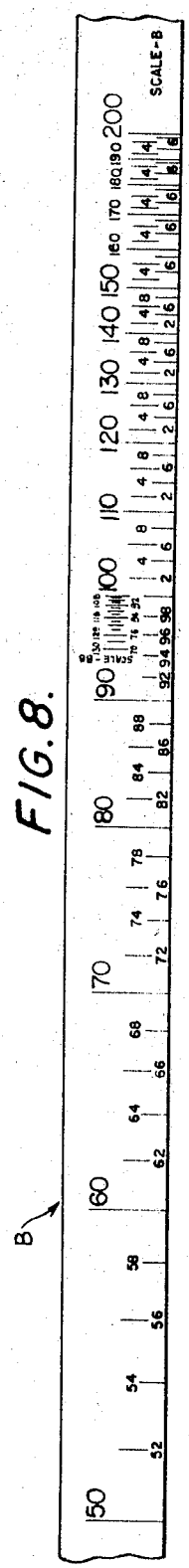
FIGURE 8 is an enlarged view of scale B, mounted on the copyboard track illustrating the scales reading directly in percentages of reproportionment.
Figure 9:
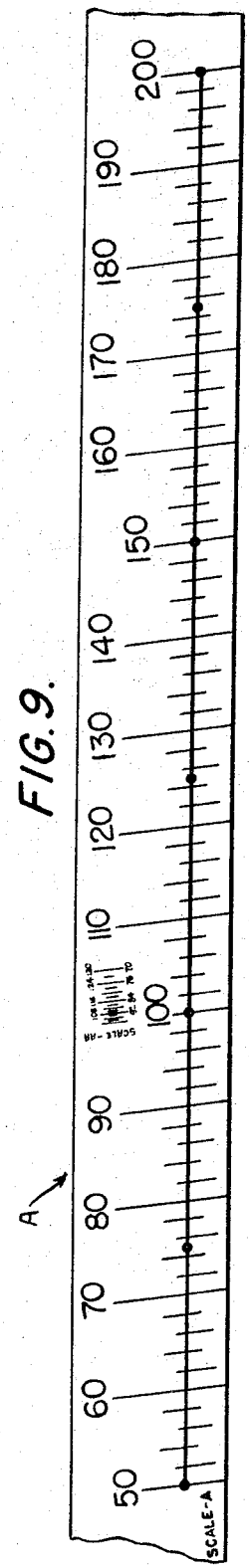
FIGURE 9 is an enlarged view of scale A mounted on the focus bed beneath the focus board base plate, illustrating the scales reading directly in percentages of reproportionment.
Figure 10:
FIGURE 10 is an enlarged view of scale D mounted on the universal lensboard, illustrating the condensing and expanding scales reading directly in percentages of reproportionment.
Figure 3:
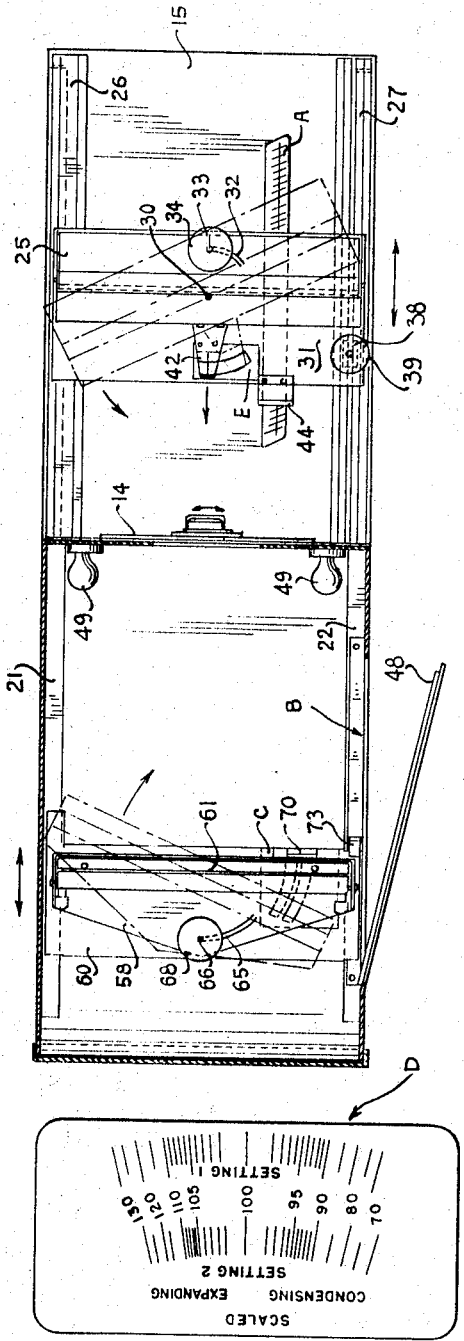
FIGURE 3 is a top plan view, partly diagrammatic and partly in section, of the camera construction of FIGURE 1, illustrating the movement of the focus board and copyboard to reproportioning positions.
Figure 4:
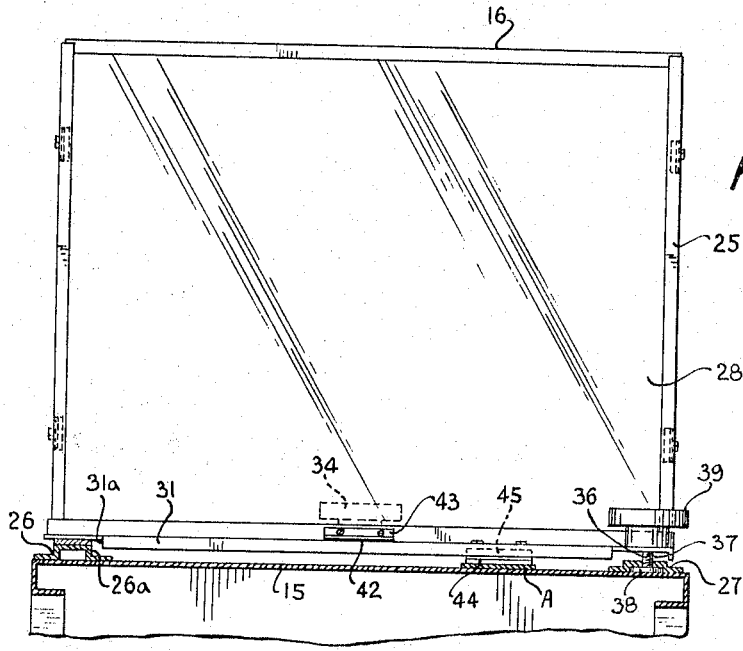
FIGURE 4 is a fragmentary sectional view taken along line 4—4 of FIGURE 2.
Figure 5:
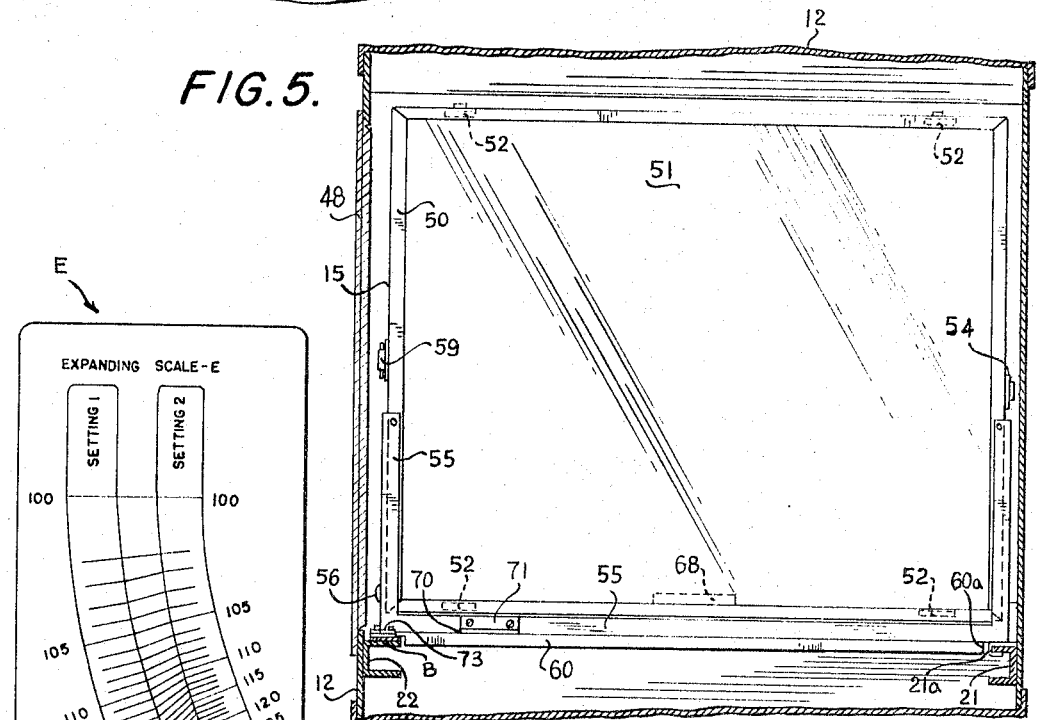
FIGURE 5 is a fragmentary sectional view taken along line 5—5 of FIGURE 2.
Figure 6:
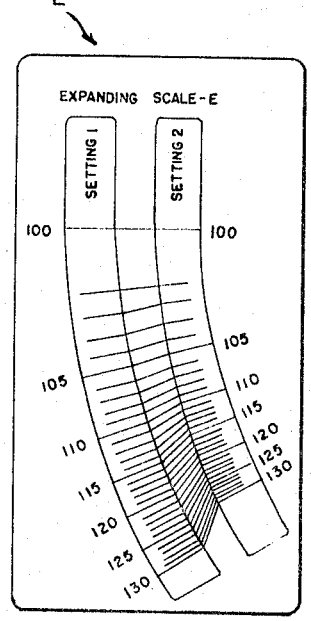
FIGURE 6 is an enlarged view of scale E, mounted on the focus board base plate, illustrating the expanding scales reading directly in percentages of reproportionment.

Referring now more particularly to the preferred embodiment of the invention shown in the accompanying drawings, there is illustrated in FIGURE 1 a reproportioning camera, designated generally by reference numeral 10, mounted on a portable table or stand 11. Camera 10 includes the camera box housing 12 having a copyboard holder 13 mounted therein, a universal lensboard 14, and a focus bed 15 supporting a focus board 16.

The camera box housing 12 rests on base 24 and has oppositely inclined top and bottom sides 17 and 18, respectively, converging from the front 19 of the housing to the back 20. The inner sides of the housing have tracks 21, 22 mounted thereon in opposed horizontal alignment for slidably supporting copyboard holder 13 within the camera box housing, more fully described hereinbelow.

Focus bed 15 is supported by the front side 19 of housing 12 and extends therefrom to outer supporting member 23 of camera base 24. At each edge of the bed, focus board tracks 26, 27 are provided in a horizontal plane with the copyboard tracks 21, 22 mounted within the box housing, tracks 26, 27 slidably supporting focus board 16 on the focus bed 15.

Focus board 16 includes a frame 25 in which a plate glass 28 is mounted for holding a sheet of film in place. Frame 25 is pivotally mounted at 30 to base 31, the pivotal movement being guided by slotted cam track 32 formed in the base 31 of the frame, cam track 32 sliding against bolt 33 which is in threaded engagement with reproportioning adjuster knob 34.

Track 26 is formed with a straight edge 26a extending along the length of the focus bed 15. In sliding contact engagement with edge 26a is straight edge 31a of base plate 31. Track 27 has a longitudinal open groove 27a, extending the length of focus bed 15, adapted to slidably receive the threaded stud portion 36 of clamp stud 37, the head 38 of stud 37 slidably received between bed 15 and track 27, the other end of the stud 36 being in threaded engagement with focus adjusting knob 39.

Focus board 16 includes reproportioning indicator 42, mounted by bracket 43 to the bottom of frame 25, so as to extend outwardly therefrom directly over, and in close, spaced relationship to, reproportionment scale E, fixed to base 31. In like manner, size indicator 44 is mounted by bracket 45 to base 31 so as to extend outwardly therefrom directly over and in close spaced relationship to size scale A.

With the foregoing description in mind, focus board 16 may be adjusted as follows: focus adjusting knob 39 is unloosened and the focus board moved along tracks 26, 27 until the hairline of size indicator 44 is aligned with the desired percentage of enlargement or reduction as indicated by scale A. Pressure is then applied to base 31 in a direction transversely of the focus bed so as "square" edge 31a of the base with edge 26a of track 26, thereby squaring the focus board into direct alignment with the lens 81, mounted on lensboard 14, and copyboard 13. Adjusting knob 39 is thereafter tightened, drawing the base 31 and head 38 of clamp stud 37 into fixed, clamping engagement with track 27. With the focus board in fixed, squared alignment, reproportioning adjustment knob 34 is loosened and frame 25 pivoted until the hairline of reproportioning indicator 42 is aligned with the desired percentage of reproportionment indicated by scale E, whereupon knob 34 is retightened.

Copyboard 13 is constructed and mounted within housing box 12 for a sliding, square adjustment in a manner similar to that for focus board 16.

Thus, copyboard 13 includes a frame 50 in which plate glass 51 is held by retaining clips 52. A pressure plate 53 is hingedly attached to one side of frame 50 by means of hinge 54, the frame and pressure plate being pivotally mounted in a trunnion bracket 55 by bushings 56. Frame 50 includes a bottom plate 58 to which trunnion bracket 55 is secured, plate 58 being pivotally mounted to base 60 and 61, the pivotal movement being guided by slotted cam track 65 formed in base 60, cam track 65 sliding against bolt 66 fixed to the base and in threaded engagement with reproportioning adjustor knob 68. Base 60 is also provided with a straight edge 60a in abutting, sliding contact with straight edge 21a of track 21.

Similarly to focus board 16, copyboard 13 includes a reproportioning indicator 70, mounted by bracket 71 to trunnion bracket 55 so as to extend outwardly therefrom directly over, and in close spaced relationship to, reproportionment scale C, fixed to base 60. In like manner, size indicator 73 is mounted by bracket 74 to base 60 so as to extend outwardly therefrom directly over size scale B, which is preferably positioned on track 22.

It will be understood that copyboard 13 is adjusted to the desired position of size enlargement or reduction and degree of reproportionment in the same manner as that previously described for focus board 16.

With reference to FIGURES 11–14, there is illustrated a lensboard designated generally by reference numeral 14 having a conventional lens 81 pivotally mounted to frame 82 having magnets 83 at each corner thereof. It will be seen that magnets 83 hold the lensboard securely against the camera housing providing a light-tight seal over opening 29 in front 19 of the housing 12, and permit the lens 81 to be positioned at any angle in the vertical plane of the housing front, and at any vertical and horizontal position in the housing opening.

Lens 81 is mounted in lensboard 14 to permit angular movement of the lens corresponding to the degrees of reproportionment for which the copy and film boards have been adjusted. To this end, lens 81 is fitted with lens ring 84 and both are attached to a swivel mounting ring 85 by screws 86, or like means. Mounting ring 85 is provided with diametrically opposed cylindrical studs 87, 88 affixed thereto and pivotally mounted between brackets 89, 90, and vertically opposed semi-cylindrical recesses 91, 92, respectively, in frame 82.

Pivotal movement is imparted to the mounted lens by means of control rod 100, extending substantially perpendicularly from swivel mount stud 88 through frame 82. The outer end 101 of rod 100 is threaded for receiving thumb screw 102 thereon. The inner end of rod 100 terminates in a leg 103 connected to lever 94 extending from swivel stud 88. Tension is provided in the swivel control unit by means of thumb screw 102 bearing against frame 82 at the outer end of the control rod and by means of tension spring 105, attached to frame 82 by bracket 106 and hooked over leg 103 at the inner end of the rod.

Thus, tightening and loosening thumb screw 102 against frame 82 reciprocates control rod 100 thereby rotating swivel stud 88 and, hence, lens 81 mounted in swivel mounting ring 85. So that a light-tight seal is continuously provided over opening 29 in housing 19, a diaphragm 110, constructed of rubber or other suitable material, is provided, extending annularly from lens ring 84 to frame 82.

In a manner similar to both the copyboard and focus board, a reproportioning indicator 112 is mounted by means of a bracket 113, or other suitable means, to the lens ring 84 and reproportioning scale D is mounted to frame 82 directly beneath indicator 112. However, reproportioning scale D is provided with both degrees of expansion and degrees of condensation, while scale C is calibrated only for condensation and scale E only for expansion.

With a camera constructed in accordance with the invention placed within a dark room and a negative film positioned on the focus board 16, a typical and illustrative operation of the camera is as follows: Assuming it is desired to reproportion a copy to 125% of its present size, the copy is loaded into copyboard 13 by tilting frame 60 to a horizontal position, opening pressure plate 53, inserting the copy against glass 51 and thereafter closing pressure plate 53 against frame 50, pressure plate 53 holding the copy securely against glass 51, being locked in place by snap-catch 59. The frame 50 is then tilted back to the vertical plane, base 60 moved along tracks 21, 22 until the hairline of indicator 73 is positioned at 125 on scale B, and edges 60a and 21a squared-up. Indicator 71 is maintained on the 100 setting of condensing scale C. Focus board 16 is then, in like manner, moved along tracks 26, 27, set at 125 on scale A by means of indicator 44, squared-up by abutting edges 31a and 26a, and knob 39 tightened. Thereafter, focus board 16 is swiveled along cam track 32 and set at 125 on expansion scale E by means of indicator 42. Lens 81 is then set at 125 on reproportioning scale D by turning thumb screw 102.

With the foregoing adjustments made, the camera is ready to reproportion the copy, which is done in a manner well known in the art. Briefly, door 48 of housing box 12 is closed, the copy illuminated by switching on electric light bulbs 49 (four) or other suitable means, thereby exposing the negative on focus board 16. The lights are then switched off, the exposed negative loaded in copyboard 13 in place of the original copy, a second negative positioned on the focus board, and the exposure repeated.

Development of the second negative produces a positive, squared-up copy, reproportioned 125% of the original size.

It will be understood that the reproportioning procedure requires that one of the copy or focus boards must remain parallel to the lensboard. Thus, if it is desired to condense the size of the original copy, focus board 16 would remain at the 100 setting and copyboard 13 would be swiveled to the desired percentage of condensation.

It will be seen from the foregoing description of a typical operation of the camera that all the adjustments and exposures can be made from a single position at the side of the camera box housing, resulting in a fast, efficient, simplified operation.

It will be apparent to those of ordinary skill in the art that the simplified construction of a reproportioning camera embodying my invention, permitting adjustment of both the copyboard and focus board from the side, facilitates making perspective shots, where both the boards are adjusted simultaneously, and is convenient for "dodging," wherein an opaque sheet is held over a portion of the focus board to prevent exposure of a part of the negative.

Further, the camera may be easily used as a direct copying machine by replacing focus board 16 with a mirror angled to reflect the image from lens 81 toward the focus bed and positioning the negative on the base 31.

While the invention is in no way limited to any particular size or materials of construction, an example may be given of a working model as a guide to the manufacture of a suitable camera. Thus, a camera capable of 50% reduction to 200% enlargement and reproportionment from 70-130% was constructed with focus and copyboards 14" x 17", and overall dimensions 5 feet long, 20 inches wide, and 5 feet 5 inches in height. Illumination may be by four (4) 100 watt incandescent light bulbs and a suitable lens is a Wollensak Graphic, Rapter wide angle, f6.8 to f45.

The invention in its broader aspects is not limited to the specific embodiment herein shown and described but departures may be made therefrom within the scope of the accompanying claims, without departing from the principles of the invention and without sacrificing its chief advantages.

What is claimed is:

1. A reproportioning camera, comprising: a camera box housing including illumination means and an opening therein for a camera lens, a focus bed, said housing and said bed each having slide means, each of said slide means being in a common plane and comprising a pair of parallel tracks, one track of each pair of tracks having a straight edge, a focus board detachably slidably mounted on said focus bed slide means, a copyboard detachably slidably mounted on said housing box slide means, each of said copyboard and said focus board being pivotally mounted on a base member having a straight edge adapted to be brought into sliding contact with the corresponding straight edge of each of said pair of tracks for said focus bed and said housing box, whereby said copyboard and said focus board may be slidably repositioned as desired as solid, integrated structures in squared-up alignment with respect to each other, means mounting said lens over said housing opening for universal movement, said camera lens mounting means including a lensboard and magnetic means attaching said lensboard to said camera box housing, and reproportioning scale means for each of said focus board, copyboard, and lens, said scales reading directly in percentages of reproportionment.

2. A reproportioning camera as claimed in claim 1, including clamping means for holding said copyboard and said focus board in squared-up alignment on said parallel tracks.

3. A reproportioning camera as claimed in claim 1, wherein the pivotal movement of said focus board and said copyboard is guided by a slotted cam track located in each of said base members and including clamping means holding said focus and copyboards in position for the desired percentage of reproportionment.

References Cited by the Examiner

UNITED STATES PATENTS

| 2,335,700 | 11/1943 | Rogers | 88—24 |
| 2,607,268 | 8/1952 | Bartz | 88—24 |
| 3,022,706 | 2/1962 | Kargl | 88—24 |
| 3,230,822 | 1/1966 | Wanielista | 88—24 |

NORTON ANSHER, *Primary Examiner.*

R. A. WINTERCORN, *Assistant Examiner.*